Oct. 11, 1927.
E. J. MARKEL
1,644,686
REFLECTOR ATTACHMENT FOR VEHICLE HEADLIGHTS
Filed Nov. 5, 1925
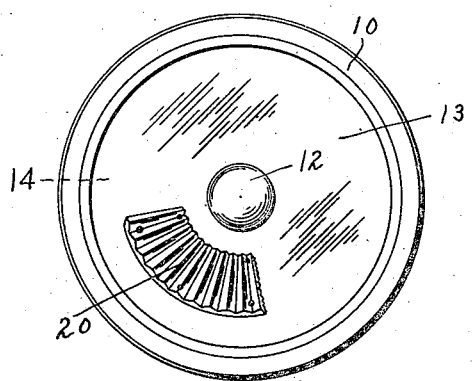
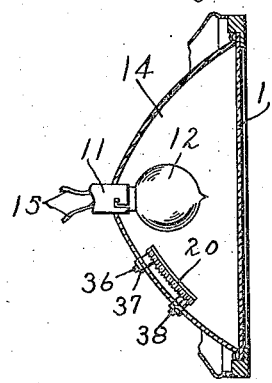
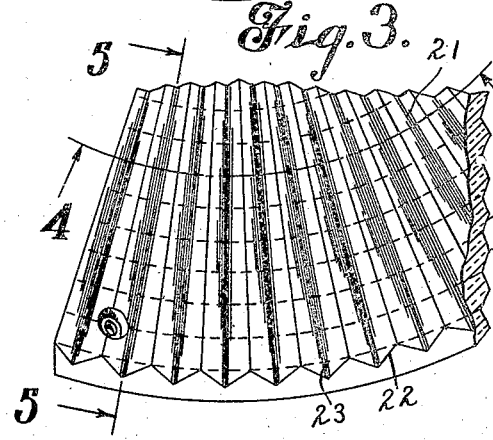
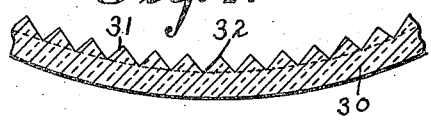
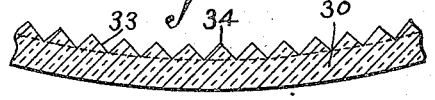
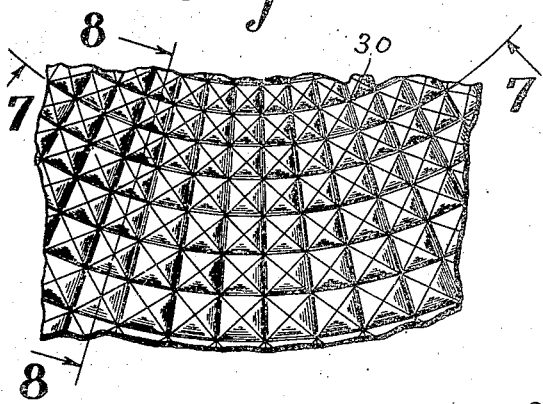
Inventor
Emerich J. Markel
By Henry E. Rockwell
Attorney Patented Oct. 11, 1927.

1,644,686

UNITED STATES PATENT OFFICE.

EMERICH J. MARKEL, OF NEW HAVEN, CONNECTICUT.

REFLECTOR ATTACHMENT FOR VEHICLE HEADLIGHTS.

Application filed November 5, 1925. Serial No. 67,068.

This invention relates to lamps and more particularly to lamps wherein the light from the light source is reflected by a reflector which partially surrounds the same. More specifically the invention relates to a vehicle headlight wherein an electric light or other light source is partially surrounded by a reflecting surface whereby light rays are reflected forwardly of the vehicle to illuminate the roadway in advance thereof.

The reflected rays of light from headlight reflectors in general use are thrown forwardly by the reflecting surface thereof in a widely diverging circle, the rays which are reflected from the upper and right-hand portions of the reflector being thrown downwardly and to the right of the vehicle, while the rays reflected from the lower and left-hand portions are thrown upwardly and to the left of the vehicle. It has been found that the rays of light which are reflected from a certain section of the lower left-hand portion of the reflector, are the rays which cause the blinding glare offending the driver of an approaching vehicle. The entire elimination of these rays has been suggested by covering this portion of the reflecting surface so as to destroy the effect thereof as a reflector. This method has not been found to be satisfactory. All the light rays which it is possible to obtain from the vehicle headlight are useful and should be conserved in order to efficiently illuminate the roadway in advance of the vehicle.

The principal problem, therefore, is one of properly directing and controlling the light rays on headlights or the like so that approaching vehicle drivers will not be offended by the glare caused by the reflector, and at the same time to insure proper lighting of the roadway so as to allow sufficient visibility thereof for the operator of the vehicle having a headlight under consideration. A device which will accomplish the above will increase the safety and pleasure of night-driving and will tend to decrease the number of accidents caused by the blinding glare from the headlights of an approaching vehicle.

One object of this invention, therefore, is to provide a headlight for a vehicle or the like, which will have the advantages above mentioned.

Another object of this invention is to provide an attachment for a headlight or the like by the use of which the headlight will have the advantages pointed out above.

A still further object of this invention is to provide means for use in combination with a reflector of a headlight or the like, whereby the light rays reflected from a certain section of the reflector thereof will be properly controlled so that the offending glare therefrom will be substantially eliminated.

Other objects of this invention include providing headlights or the like with a secondary reflecting or light ray diffusing means, and the particular structure and arrangement of this means in combination with the other parts of the headlight by the use of which the direct rays from the source of light will be reflected and certain of the reflected rays from the primary reflector will be interrupted and diffused in such a manner that the light therefrom will not be entirely destroyed but will be properly controlled so as to prevent any offending glare.

To these and other ends the invention consists in the novel features and combinations thereof to be hereinafter described and claimed.

In the accompanying drawings:

Fig. 1 is a front view of a headlight embodying the features of my invention;

Fig. 2 is a sectional view through the vertical axis of the reflector shown in Fig. 1;

Fig. 3 is an enlarged portion of the secondary reflecting or light diffusing member of a preferred form which is adapted for use in a headlight or the like to obtain the advantages of this invention;

Fig. 4 is a section on line 4—4 of Fig. 3;

Fig. 5 is a section on line 5—5 of Fig. 3;

Fig. 6 is an enlarged portion of a somewhat modified form of secondary reflecting or light diffusing member;

Fig. 7 is a section on line 7—7 of Fig. 6, and

Fig. 8 is a section on line 8—8 of Fig. 6.

Figs. 1 and 2 illustrate one type of headlight at present in general use upon vehicles and consist of the outer casing 10, the socket 11, the electric lamp globe 12, the lens 13 and the reflector 14. These parts are assembled in various ways to constitute a complete headlight, but the specific assembly does not form a part of this invention other than in the general arrangement thereof, as illustrated. The general practice is to provide a glass lens 13 which is mounted upon the casing 10 in front of the lamp globe 12. The lamp globe 12 is within and partially surrounded by the reflector 14 and is supplied with the necessary energy to illuminate the same through the wires 15 by means of any suitable source of electrical energy.

The secondary reflector or light ray diffusing member 20 is shown in Fig. 1 in the preferred position within the headlight. The member 20 is of such structure as to efficiently perform the necessary functions whereby the advantages above noted are obtained. This member consists of a segment of cast or moulded material which is preferably transparent and preferably of the form shown in Figs. 3, 4 and 5. Clear glass has been found to be a satisfactory material for use in making the member 20. The member 20, as illustrated, is arc-shaped and has substantially the same curvature as the reflector 14. In this instance it is provided upon its inner or concave surface 21 with corrugations 22, which form ridges 23. The corrugations 22 are radially disposed with respect to the source of light. The outer or convex surface 24 of the member 20 is provided with corrugations 25, which form ridges 26. The corrugations 25 are in the form of arcs, each being concentric with the respective edges of the member 20, and are preferably arcs of a circle whose center is at the source of light. The corrugations 22 and 25 may be moulded into the material at the time of moulding the same or may be cut therein after the same has been moulded.

In Figs. 6, 7 and 8 the member 30 is of a somewhat modified form. In this instance, the radially extending corrugations 31, which form ridges 32, are arranged as in the previous form, member 20, upon the concave surface, but the arc-shaped corrugations 33 which form the ridges 34 are also formed upon the concave inner surface whereby a series of prisms is formed upon the concave surface thereof. Preferably all the corrugations are V-shaped and are spaced apart sufficiently so that all of the ridges are inverted V-shaped.

The effect of both forms is similar. Being of transparent material, a portion of the light rays emitted from the lamp or source of light 12, pass through the member 20 and strike against the reflecting surface of the reflector 14 thereunder from where they are reflected back and in passing through the member 20 due to the formation of the surface of said member, are interrupted and diffused so that no direct light rays are emitted from the headlight from this portion of the reflector 14. The driver of an approaching vehicle, therefore, is not offended and discomforted by a blinding glare as is usual in previous types of headlights.

While the reflected rays are diffused and interrupted as above, other light rays from the source of light strike the member 20 and due to the formation of the concave surface are reflected outwardly in such a manner that the roadway is sufficiently illuminated, and in some instances, increasingly illuminated by the addition of these rays to the ones directly reflected from the uncovered portions of the reflector 14. The reflected rays of light from the member 20, due to the formation of the concave surface are likewise interrupted and distorted so that no offending glare is produced.

The member 20 is preferably secured to the reflector 14 by means of screws 36 which pass through the material of the member 20 and the reflector 14, and is securely clamped in place by nuts 37. Washers 38 of rubber, cork or the like, are placed between the member 20 and the reflector 14 to prevent rattles and possible breaking of the member by sudden jars. The washers 38 also act as spacing blocks so that the segment is retained in proper spaced relation relative to the reflector.

As a certain portion of the lower left-hand section of the reflector 14 reflects the light rays which normally would cause the offending glare, it is only necessary to interrupt and diffuse these light rays, and therefore, the member 20 is only of sufficient area to cover this portion of the reflector. The member 20, therefore, is preferably placed below the lamp globe or source of light 12, and to the left of the center thereof, and is of such width that portions of the reflector 14 remain uncovered adjacent the source of light and adjacent the rim of the reflector, the member 20 being spaced from each intermediate these points. In other words, the segment 20 is preferably disposed adjacent the surface of the reflector 14, below the source of light 12, and to the left of a center line through the reflector, perpendicular to the horizontal axis thereof when looking directly toward the reflector. As shown in Fig. 1, the greater portion of the segment 20 is preferably disposed to the left of the vertical axis of the reflector 12, with the remainder of the segment 20 disposed to the right thereof, the term "vertical axis" being used to define a center line drawn perpendicularly to the horizontal axis of the reflector and across the face thereof. Lengthwise, the segment is of such dimensions that it extends preferably not over more than 90 degrees of the reflecting surface, and in some instances, less, the amount largely depending upon the curvature of the reflecting surface at this point.

While I have shown and described a preferred embodiment of my invention, it will be understood that it is not to be limited to all the details shown, but is capable of modification and variation which will be within the spirit of the invention and the scope of the appended claims.

What I claim is:

1. A reflector attachment for a headlight or the like having a concave reflector and a source of light disposed in the center of said reflector, said attachment, comprising a segment of transparent material, said segment being arc-shaped and having a concave upper surface substantially parallel with the surface of said reflector and being corrugated both radially and arcuately.

2. In a lamp, a source of light rays, a reflecting surface partially surrounding the source of light, a segment of transparent material disposed between the source of light and parallel with and spaced from said reflecting surface, said segment having a corrugated concave upper surface, the corrugations thereof extending radially across said surface whereby the light rays from the source of light will be interrupted and diffused.

3. In a lamp, a source of light rays, a reflecting surface partially surrounding the source of light, a segment of transparent material disposed between the source of light and parallel with and spaced from said reflecting surface, said segment having a concave upper surface and a convex under surface, said surfaces being corrugated, the corrugations in one surface being radially disposed with respect to the source of light, and the corrugations in the other surface being arcuately disposed in relation to the source of light whereby the light rays from said source of light will be interrupted and diffused.

4. In a lamp, a source of light rays, a reflecting surface partially surrounding the source of light, a plate-like arc-shaped segment of transparent material parallel with and spaced from the reflecting surface and disposed between the source of light and said reflecting surface, said segment being corrugated upon one of its surfaces whereby the light rays from the source of light will be interrupted and diffused.

5. In a vehicle headlight, the combination of a cup-shaped reflector, a source of light disposed within said reflector at substantially the center thereof, and a segment of transparent material, said segment being secured upon the surface of said reflector intermediate the source of light and the outer edge of the reflector and disposed below said source of light and to one side of the vertical axis of said reflector.

6. In a vehicle headlight, the combination of a cup-shaped reflector, a source of light at the center of said reflector, and a transparent member secured to the surface of said reflector intermediate the source of light and the outer edge of said reflector, the upper and lower edges of said member being spaced from said source of light and said reflector edge and having a surface thereof parallel to and spaced from the surface of said reflector, said member extending arcuately farther beyond one side of the vertical axis of said source of light than it does beyond the other side thereof.

7. A reflector attachment for a headlight or the like, having a reflector and a source of light, said attachment comprising a segment of transparent material, said segment being secured to the surface of said reflector intermediate the source of light and the outer periphery of said reflector, portions of said segment being disposed below the horizontal axis of said reflector and to one side of the perpendicular center line thereof, and being adapted to allow light rays to pass therethrough and to interrupt and diffuse reflected light rays from the reflector and source of light.

8. In a lamp, a source of light rays, a concave reflecting surface partially surrounding the source of light, a plate-like transparent member secured to the reflecting surface and being disposed between the source of light and said reflecting surface below and to one side of the center of said reflecting surface, said member being corrugated both radially and arcuately whereby the light rays of the source of light will be interrupted and diffused.

9. In a lamp, a source of light, a cup-shaped reflector for said source of light, and a member associated with said reflector, said member including in its structure a portion adapted to diffuse certain of the light rays from said source of light, said diffusing portion being disposed in its entirety adjacent the surface of said reflector and secured thereto intermediate the outer periphery thereof and said source of light and extending arcuately beyond the perpendicular center line of said reflector at both sides thereof.

In witness whereof, I have hereunto set my hand this 3rd day of November, 1925.

EMERICH J. MARKEL.